(12) United States Patent
Odumodu

(10) Patent No.: US 8,673,473 B2
(45) Date of Patent: Mar. 18, 2014

(54) INTEGRATED COOLING FIN AND FRAME

(75) Inventor: Kennedy U. Odumodu, Ann Arbor, MI (US)

(73) Assignee: GM Global Technology Operations LLC, Detroit, MI (US)

(*) Notice: Subject to any disclaimer, the term of this patent is extended or adjusted under 35 U.S.C. 154(b) by 555 days.

(21) Appl. No.: 12/853,620

(22) Filed: Aug. 10, 2010

(65) Prior Publication Data

US 2012/0040223 A1 Feb. 16, 2012

(51) Int. Cl.
*H01M 10/0585* (2010.01)
*H01M 10/50* (2006.01)

(52) U.S. Cl.
USPC ............ 429/120; 429/156; 429/159; 429/162

(58) Field of Classification Search
USPC ................................... 429/120, 156, 159, 162
See application file for complete search history.

(56) References Cited

U.S. PATENT DOCUMENTS

| | | | |
|---|---|---|---|
| 6,060,198 A | 5/2000 | Snaper | |
| 6,410,184 B1 | 6/2002 | Horiuchi et al. | |
| 6,821,671 B2 | 11/2004 | Hinton et al. | |
| 7,504,179 B2 | 3/2009 | Tanjou et al. | |
| 2003/0017380 A1 | 1/2003 | Cooper et al. | |
| 2003/0211384 A1 | 11/2003 | Hamada et al. | |
| 2004/0038122 A1 | 2/2004 | Hisamitsu et al. | |
| 2005/0089750 A1 | 4/2005 | Ng et al. | |
| 2005/0089751 A1 | 4/2005 | Oogami et al. | |
| 2007/0141457 A1 | 6/2007 | Amagai | |
| 2008/0193830 A1 | 8/2008 | Buck et al. | |
| 2009/0029251 A1 | 1/2009 | Baba | |
| 2009/0142628 A1* | 6/2009 | Okada et al. | 429/8 |
| 2009/0325051 A1* | 12/2009 | Niedzwiecki et al. | 429/120 |
| 2010/0055993 A1 | 3/2010 | Ikeda et al. | |
| 2010/0143782 A1 | 6/2010 | Kruger et al. | |
| 2010/0266883 A1 | 10/2010 | Koetting et al. | |
| 2010/0273091 A1 | 10/2010 | Brey et al. | |
| 2011/0052969 A1 | 3/2011 | Cai et al. | |
| 2011/0162820 A1* | 7/2011 | Weber et al. | 165/104.19 |
| 2011/0293982 A1 | 12/2011 | Martz et al. | |

FOREIGN PATENT DOCUMENTS

| | | | |
|---|---|---|---|
| JP | 11-176400 A | | 7/1999 |
| JP | 11176400 A | * | 7/1999 |
| JP | 2009105058 A | * | 5/2009 |
| KR | 2010 081674 A | | 7/2010 |

OTHER PUBLICATIONS

Arima et al., Machine translation of JP 11-176400 A, Jul. 1999.*
Goto et al., Machine translation of JP 2009-105058 A, May 2009.*
U.S. Office Action dated Jun. 8, 2012 pertaining to U.S. Appl. No. 12/853,462, filed Aug. 10, 2010.

(Continued)

*Primary Examiner* — Sean P Cullen
(74) *Attorney, Agent, or Firm* — Dinsmore & Shohl LLP

(57) ABSTRACT

An integrated cooling fin and frame is described. The integrated cooling fin and frame includes a cooling fin having a cooling channel adjacent to at least one edge, the cooling channel having an inlet and an outlet; and a frame around the cooling fin and covering the edges of the cooling fin, the frame having an opening for the inlet and outlet of the cooling channel. A battery pack containing the integrated cooling fin and frame and a method of making the integrated cooling fin and frame are also described.

19 Claims, 15 Drawing Sheets

(56) References Cited

OTHER PUBLICATIONS

Non-Final Office Action dated Mar. 1, 2013 pertaining to U.S. Appl. No. 12/853,521, filed Aug. 10, 2010.
Final Office Action dated Mar. 1, 2013 pertaining to U.S. Appl. No. 12/774,873, filed May 6, 2010.
Office Action mailed Sep. 20, 2012 pertaining to U.S. Appl. No. 12/774,873.
Office Action mailed Oct. 29, 2012 pertaining to U.S. Appl. No. 12/853,521.
Office Action mailed Jan. 04, 2013 pertaining to U.S. Appl. No. 12/774,873.
Office Action mailed Jan. 17, 2013 pertaining to U.S. Appl. No. 12/853,462.
Non-Final Office Action mailed May 22, 2013 pertaining to U.S. Appl. No. 121774,873, filed May 6, 2010.
Final Office Action dated Oct. 2, 2013 pertaining to U.S. Appl. No. 12/774,873, filed May 6, 2010.

\* cited by examiner

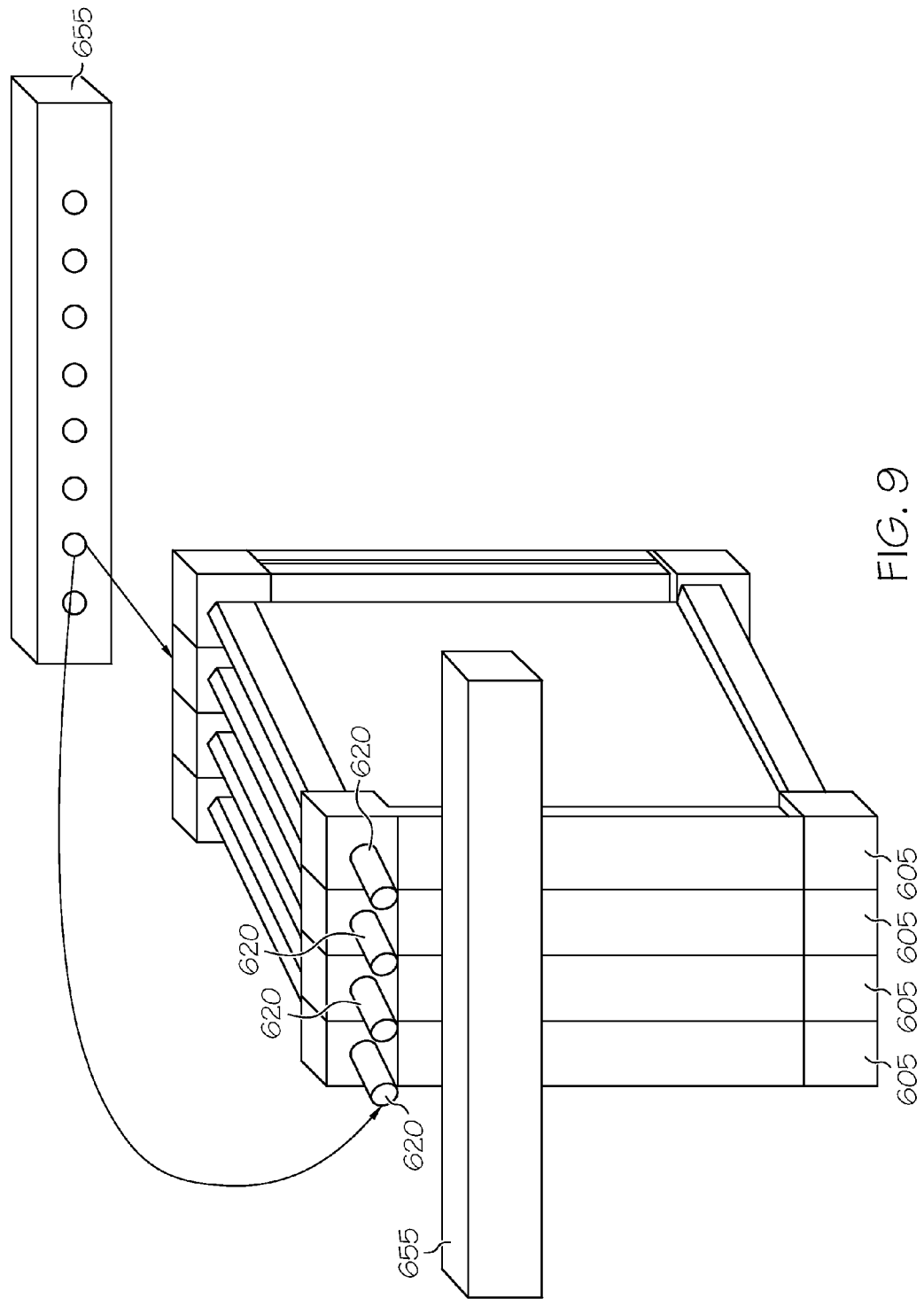

INTEGRATED COOLING FIN AND FRAME

STATEMENT OF RELATED CASES

This application is related to U.S. Ser. No. 12/853,462, entitled INTEGRATED STACKABLE BATTERY, filed on Aug. 10, 2010, which is incorporated herein by reference.

BACKGROUND OF THE INVENTION

This invention relates generally to battery packs and more particularly to an integrated cooling fin and frame for battery packs.

Currently, the battery cells in some battery packs are positioned in frames which are used to house the cells, cooling fins (plates), and expansion material, such as foam sheets. However, in some arrangements, these individual components can slide relative to one another which increases the dimensional variation of the battery pack. In addition, the movement potentially exposes the edges of the cell to the cooling fins, which can result in arc flashing.

Therefore, there is a need for a battery pack that reduces the likelihood of arc flashing

SUMMARY OF THE INVENTION

The present invention meets than need. One aspect of the invention is an integrated cooling fin and frame. The integrated cooling fin and frame includes a cooling fin having a cooling channel adjacent to at least one edge, the cooling channel having an inlet and an outlet; and a frame around the cooling fin and covering the edges of the cooling fin, the frame having an opening (e.g., a first opening and a second opening) for the inlet and outlet of the cooling channel.

Another aspect of the invention is a battery pack, The battery pack includes a pair of end frames, one end frame having a positive terminal and the other end frame having a negative terminal; at least one integrated cooling fin and frame comprising: a cooling fin having a cooling channel adjacent to at least one edge, the cooling channel having an inlet and an outlet; and a frame around the cooling fin and covering the edges of the cooling fin, the frame having an opening for the inlet and outlet of the cooling channel; a plurality of battery cells, each of the plurality of battery cells having a positive tab and a negative tab, the positive tab of one of the plurality of battery cells electrically connected to the positive terminal, and the negative tab of another one of the plurality of battery cells electrically connected to the negative terminal, the frame isolating the positive and negative tabs of the battery cells from the cooling fin; at least one power connector electrically connecting the negative tab of one of the battery cells with the positive tab of an adjacent one of the plurality of battery cells; and a fluid manifold connected to the cooling channel inlet and outlet for circulating fluid to the cooling channel.

Another aspect of the invention is a method of making an integrated cooling fin and frame. The method includes providing a cooling fin having a cooling channel on at least one edge, the cooling channel having an inlet and an outlet; and molding a frame around the cooling fin so that the frame covers the cooling channel and the edges of the cooling fin, seals the cooling fin to the frame, and has an opening for the inlet and outlet of the cooling channel.

BRIEF DESCRIPTION OF THE DRAWINGS

FIG. 9 is an illustration of the connection of a series of integrated cooling fin and frames to a manifold.

DETAILED DESCRIPTION

Figure 1:
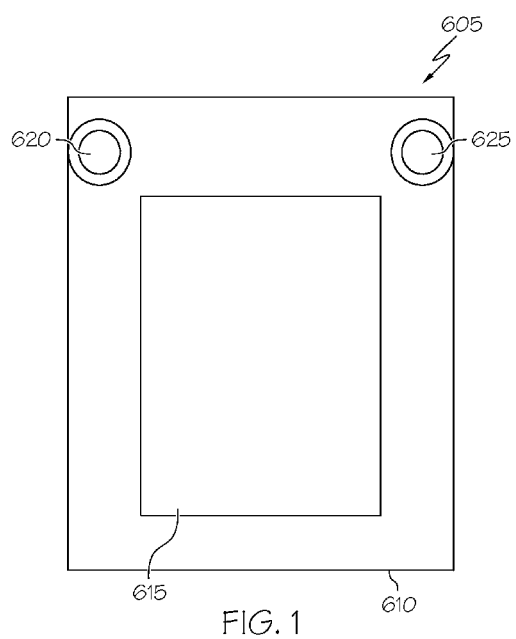
FIG. 1 is an illustration of one embodiment of the integrated cooling fin and frame.
Figure 2:
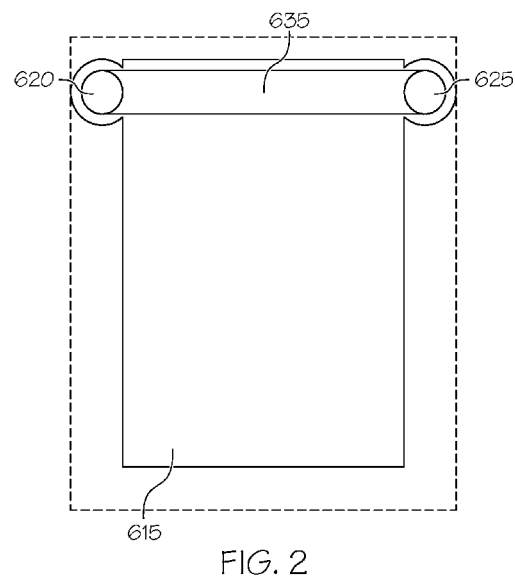
FIG. 2 is an illustration of one embodiment of the cooling fin.
Figure 3A:
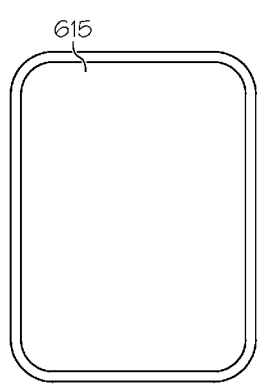
FIGS. 3A-C are illustrations of one embodiment of the cooling fin and frame.
Figure 3B:
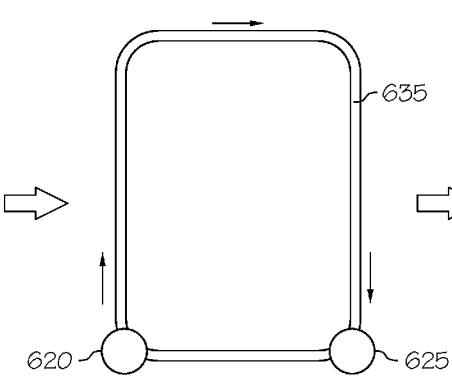
Figure 3C:
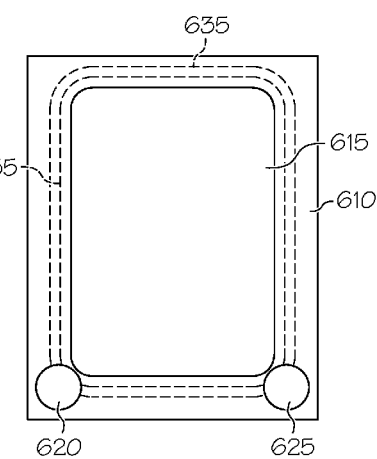

The integrated cooling fin and frame provides electrical isolation and effectively manages the heat transfer from the battery cell. The integrated cooling fin and frame electrically isolates the cell edge from the cooling fin by covering the edge of the cooling fin with the frame. The integrated cooling fin and frame eliminates the need to tape the edges of the battery cells to prevent arc flashing. The thermally conductive material of the cooling fin regulates the heat transfer from the encapsulated cell. The integrated cooling fin and frame reduces the number of separate parts, simplifying the assembly process. It allows the use of either welded or mechanical connections in making the battery cell stack. The integrated cooling fin and frames also improve the pressure distribution in the battery cell stack.

As shown in FIGS. 1-5, the integrated cooling fin and frame 605 includes a frame 610 and cooling fin 615. There is a fluid inlet 620 and fluid outlet 625 for the cooling fin 615. The frame 610 covers the edges of the cooling fin, preferably on both sides. The frame should cover all of the areas where the cell edge can contact the cooling fin.

There is a cooling channel 635 adjacent to the edge of the cooling fin between the fluid inlet 620 and fluid outlet 625. The cooling channels should be as close to the edge of the cooling fin as possible. For example, they can be about 3 mm from the edge, if desired. However, the distance from the edge can vary depending on the cell design and thermal characteristics desired. By having the cooling channel close to the edge of the cooling fin and thus at the edge of the cell as well, it eliminates the imprints the channels might leave on the surface of the cell. In this embodiment, the frame 610 covers the cooling channel 635. It is desirable for the frame to cover the cooling channel if the geometry allows for it.

Figure 4A:
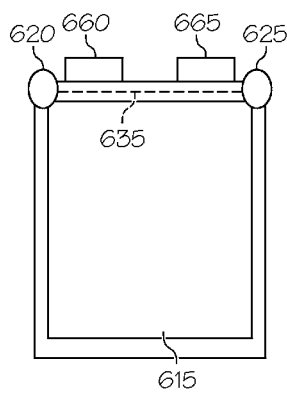
FIGS. 4A-C are illustrations of different embodiments of integrated cooling fin and frames.
Figure 4B:
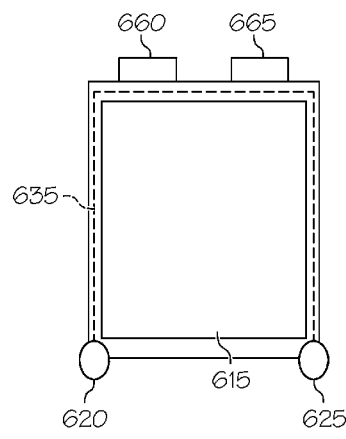
Figure 4C:
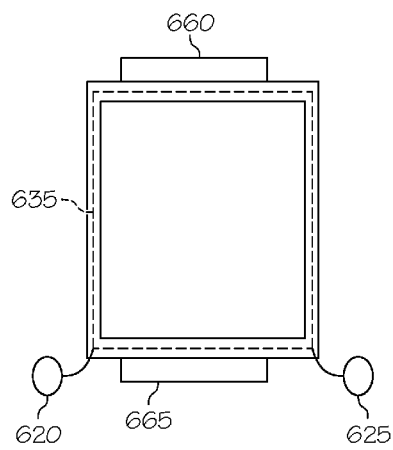
Figure 5:
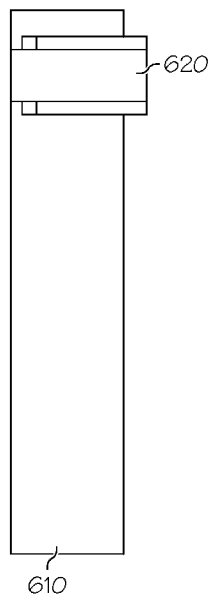
FIG. 5 is an illustration of a side view of one embodiment of the integrated cooling fin and frame.

The cooling channel can extend around one, two, three, or all four edges of the cooling fin, as needed. The position of the cooling channel can be adjusted to provide peripheral cooling and/or to support different arrangements of the fluid inlet and outlet and battery cell tab placement. For example, FIG. 4A shows battery cell tabs 660, 665 on the same side of the cooling fin as the fluid inlet 620 and fluid outlet 625. In this arrangement, cooling channel 635 can extend across one edge of the cooling fin. FIG. 4B shows battery cell tabs 660, 665 on the opposite side of the cooling fin from the fluid inlet 620 and fluid outlet 625. The cooling channel 635 can extend across three edges of the cooling fin in this situation. FIG. 4C shows cell tabs 660, 665 on opposite sides of the cooling fin. The cooling channel 635 can extend across all four edges of the cooling fin in this arrangement.

Figure 6:
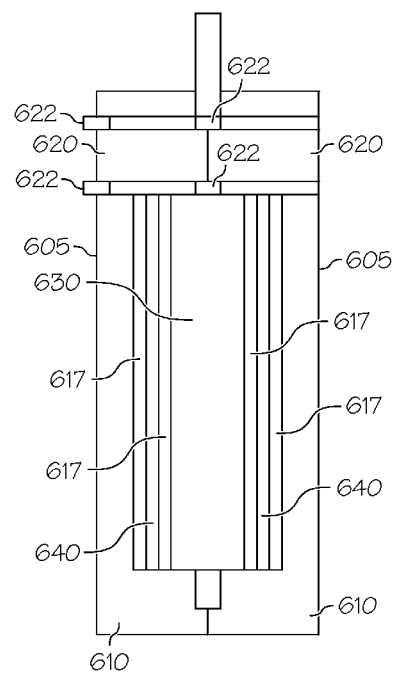
FIG. 6 is an illustration of one embodiment of a battery cell and integrated cooling fin and frames.

FIG. 6 shows a battery cell 630 positioned between two integrated cooling fin and frames 605. There are seals 622 between the fluid inlet 620 of adjacent frames. In this embodiment, the cooling fin comprises a pair of thermally conductive plates 617 separated by a layer of compressible foam 640. The compressible foam (or other expansion compensator) allows for expansion and contraction of the battery cells on either side of the cooling fin caused by the charge state, heating, and cooling of the cells. The presence of cooling fins on both sides of the battery cell provides double side cooling for enhanced thermal management.

Figure 7:
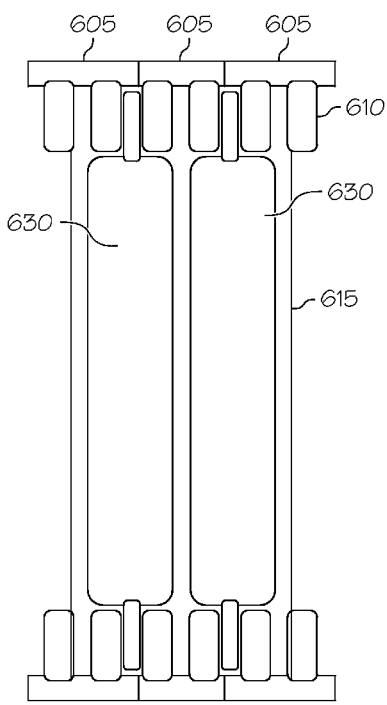
FIG. 7 is an illustration of another embodiment of battery cells and integrated cooling fin and frames.
Figure 8A:
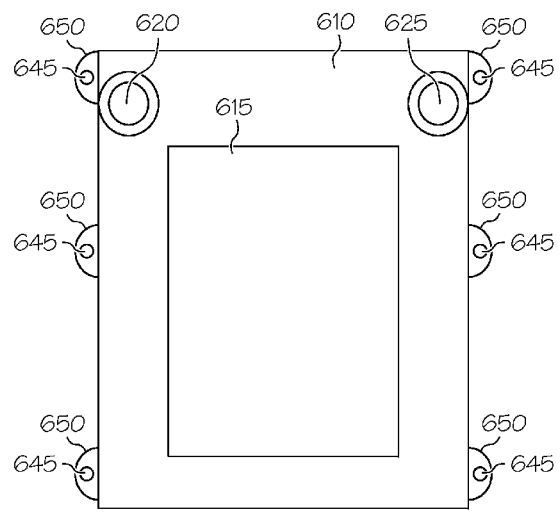
FIGS. 8A-B are illustrations of another embodiment of the integrated cooling fin and frame.
Figure 8B:
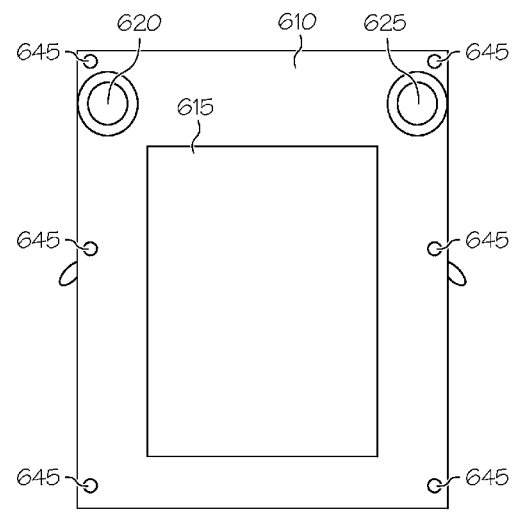

A series of battery cells 630 separated by integrated cooling fin and frames 605 can be assembled as shown in FIG. 7. The battery cells 630 can be connected either by welding the cell tabs or by using a reversible mechanical connection. One embodiment of a reversible mechanical connection is shown in FIG. 8. The frame 610 can include holes 645 for tie rods or bolts. The frame 610 can have one or more tabs 650 with holes 645 in them (FIG. 8A), or the holes 645 can extend through the frame 610 itself (FIG. 8B). When the holes extend through the frame, the holes 645 can extend through the cooling fin 615 so long as they do not interfere with the cooling channels 635. However, this would be less desirable than if the holes extend through the frame only.

FIG. 9 shows a series of batteries separated by integrated cooling fins and frames 605. Fluid manifolds 655 are attached to the fluid inlets 620 and outlets (not shown) to distribute the cooling fluid through the cooling channels. The manifolds can be brazed onto the fluid inlets and outlets, if desired. Alternatively, the manifolds can be connected using removable connection, such as with seals. The use of removable connections improves serviceability.

The cooling fins can be single plates or multilayer structures, depending on the cooling needs of the particular application. The cooling fins can be made of any conventional cooling material. Suitable materials include, but are not limited to, light-weight thermal conductors such as aluminum, alumina, copper, aluminum silicon carbide, beryllium oxide, and the like, or sandwich structures of light-weight thermal conductors and compressible foam or other expansion compensator.

The frames are typically made of a light-weight, non-conductive material. Suitable materials include, but are not limited to, plastics, such as polypropylene, nylon 6-6, and other low cost materials. The frames can be fiber-reinforced for structural strength, if desired.

The integrated cooling fin and frame can be made by molding the frame around the cooling fin. The edges of the cooling fin are covered by the frame, isolating the edges of the cooling frame from the battery cell tabs and edges. The cooling channels will also generally be covered by the frame, although this is not necessary. Suitable molding processes include, but are not limited to, injection molding, compression molding, or transfer molding, and the like. Injection molding processes are desirable, including insert molding and multi-shot injection molding. The molded design eliminates the necessity of having an additional seal between the cooling fin and the frame because the seal is formed by molding. Alternatively, the cooling fin can be inserted into the frame, and an additional seal can be included to seal the cooling fin to the frame.

The integrated cooling fin and frame can be used in conjunction with the end frames and integrated frames described U.S. Ser. No. 12/853,462, entitled INTEGRATED STACKABLE BATTERY, filed on Aug. 10, 2010, which is incorporated herein by reference. As described in Ser. No. 12/853,462, the frame can incorporate one or more of the following design features: optimal tab location and size; an embedded power connector with spring action contact mechanism or slot for external power connector; embedded thermal monitoring; embedded voltage monitor/cell charging wire; embedded local cell components of the battery management system; embedded heating/cooling fin including pouch contact mechanism; embedded heat exchanger; embedded surfaces to isolate tab edges to minimize leakage/shorts; and error proof assembly features.

Figure 10:
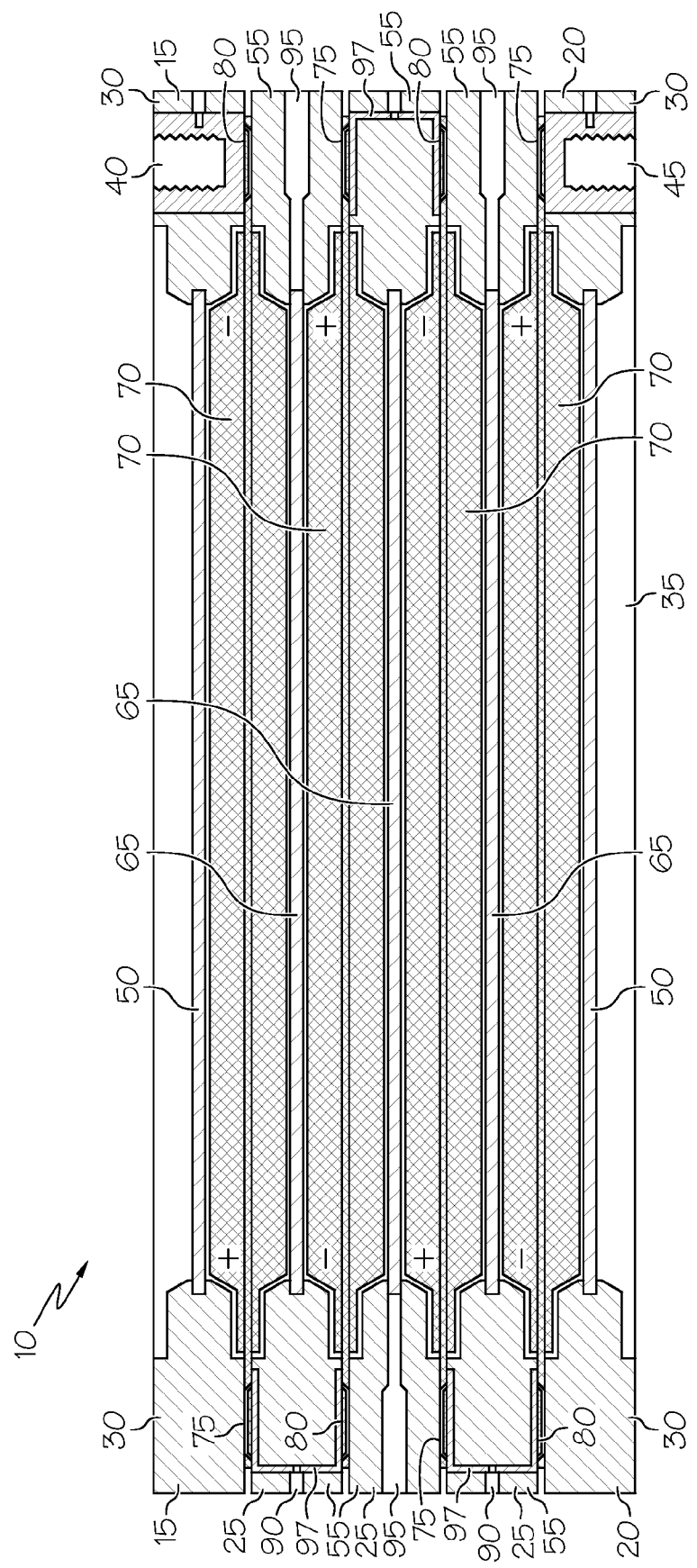
FIG. 10 is top plan view of one embodiment of an assembled battery pack.
Figure 11:
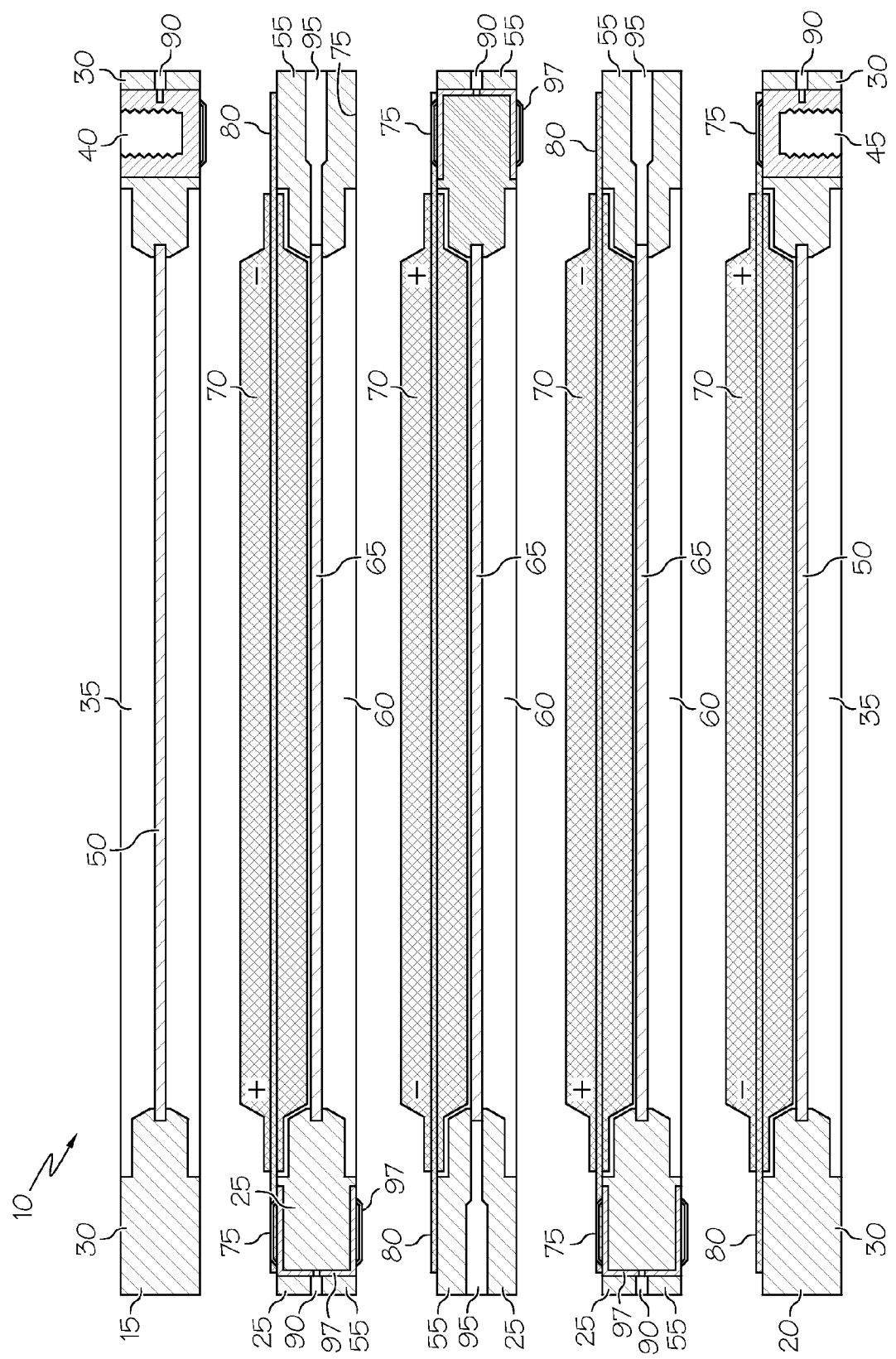
FIG. 11 is an exploded view of the embodiment of FIG. 10.

FIGS. 10-11 show one embodiment of a battery pack 10. The battery pack 10 has a pair of end frames 15, 20 and integrated frames 25 positioned between the end frames 15, 20. The end frames 15, 20 have raised edge portions 30 surrounding an inner portion 35. The inner portion 35 is typically open as shown (i.e., like a picture frame). However, there could be a thin layer extending all or part way across the inner portion, if desired. There is a negative terminal 40 in end frame 15 and a positive terminal 45 in end frame 20. The terminals can be suitable type of terminal including, but not limited to, threaded sockets and threaded studs.

The end frames 15, 20 can include a cooling fin 50 extending across all or a portion of the inner portion 35, if desired.

The integrated frames 25 have raised outer portions 55 surrounding inner portions 60. The inner portion 60 is typically open as shown (i.e., like a picture frame), although there could be a thin layer extending across all or part of the inner portion. The integrated frames 25 can include a cooling fin 65 extending partially or completely across the inner portion 60, as described above, if desired.

There is at least one integrated frame 25 in addition to the two end frames in the battery pack 10, and typically there are many. In most cases, there will be one less integrated frame than the number of battery cells connected in series. For example, if there are 18 battery cells connected in series, there could be 17 integrated frames. In some cases, there may be the same number of integrated frames and cells.

Battery cells 70 are positioned in the inner portion 60 of the integrated frames 25 and end frame 20. The battery cells 70 have positive tabs 75 and negative tabs 80. The battery cells 70 and the positive tabs 75 and negative tabs 80 are supported by the raised outer portions 55 of the integrated frames 25 or the raised edge portions 30 of the end frame 20 depending on their location in the pack. The raised edge portions of the integrated frames and end frames are designed to support (or cradle) the battery cell and tabs. The design of the raised portions depends on the particular battery cells being used. The cooling fins 50 and 65, if present, could also partially support the battery cells.

As shown, the positive battery tab 75 is on the opposite side of the battery cell from the negative tab 80. Having the cell tabs on opposite sides of the cell creates more uniform heat generation. When the cell tabs are close to one another or on one side, they tend to have a higher heat concentration and higher differences in temperature over the volume of the cell that can result in localized hot spots. However, these arrangements of cell tabs can be used with appropriate cooling. In addition, cell manufacturers also have cell tabs of various other configurations. The particular arrangement of cell tabs is not important, and integrated frame assemblies can be made to match cell tabs of any configuration.

The integrated frames and/or the end frames can optionally include voltage sensor holes 90 and temperature sensor holes 95. One desirable arrangement has the voltage sensor holes and temperature sensor holes on opposite sides of the integrated frame, although this is not required. In addition, some frames might have only voltage sensor holes, others might have only temperature sensor holes, and some frames might not have either; however, the use of these options would increase the number of parts required. The voltage sensors and temperature sensors can be connected to a battery management system (described below) if desired. Other types of sensors could also be used, if desired. The sensor holes could be designed to accommodate a particular type of sensor, or one sensor hole could be designed to accommodate a variety of sensors.

The positive and negative tabs of adjacent battery cells are electrically connected by power connectors 97. The power connectors are made of conductive materials. The power connectors can be internal or external.

Figure 12:
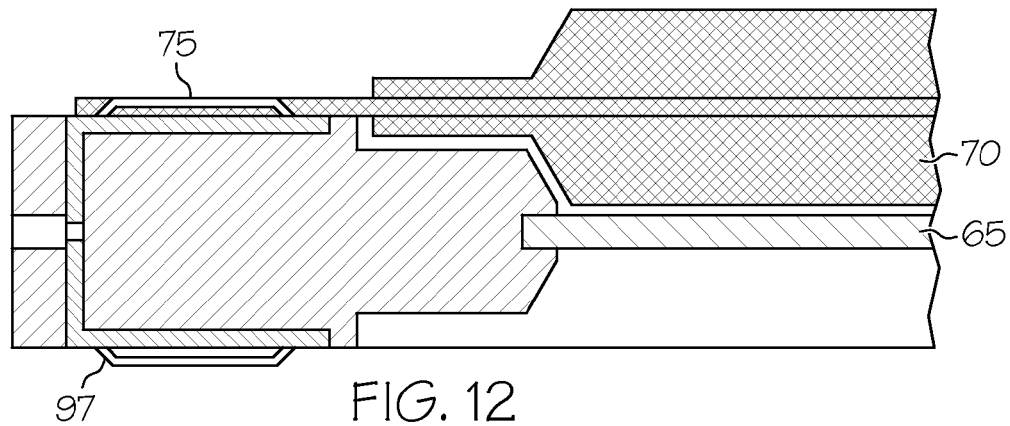
FIG. 12 is an illustration of one embodiment of an internal power connector.

FIGS. 10-12 show one embodiment of an internal power connector 97 embedded in the integrated frame. The internal power connector 97 is generally U-shaped and extends though the integrated frame with each leg of the U forming a contact surface on opposite sides of the integrated frame. The internal power connector can be spring loaded to assist in obtaining good contact with the cell tab, if desired. Pressure is applied to the power connectors by, for example, bolts extending through the stack of frames, to provide the necessary contact between the cell tabs and the power connectors to obtain a low resistance connection.

Good electrical connection between the power connector and the tabs is related to the amount of surface contact area between them. One large surface area may have difficulty in making complete contact with the cell tab if the two surfaces are not parallel. For example, a high spot at one end may not allow the opposite end to move far enough to make solid contact. The surface of the power connector can be segmented by adding slits or cuts providing multiple smaller surfaces, each having increased independent movement. Consequently, a high spot on at one end will not prevent the next segment from making good contact.

In addition, the surface roughness of the connector can be modified by chemical or mechanical abrasives, or by depositing a coating on the surface.

Figure 13:
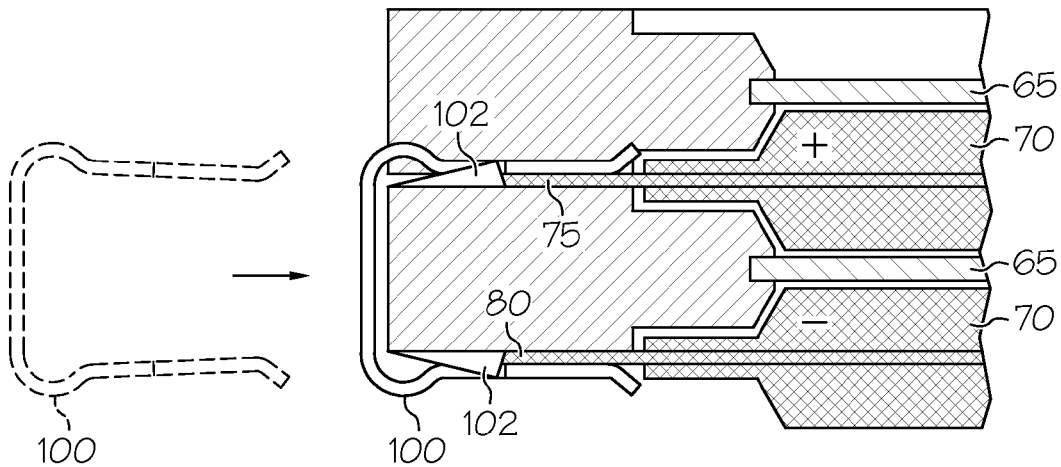
FIG. 13 is an illustration of one embodiment of a spring loaded metal clip used to connect battery cells.

One embodiment of an external power connector is a spring loaded conductive clip 100 shown in FIG. 13. The spring force of the clips is typically in the range of about 500 to about 1500 N. The clip can be made of a conductive material, including, but not limited to, metals. One example of suitable material for a clip is spring steel coated or clad (or another process) with copper and nickel.

Figure 14:
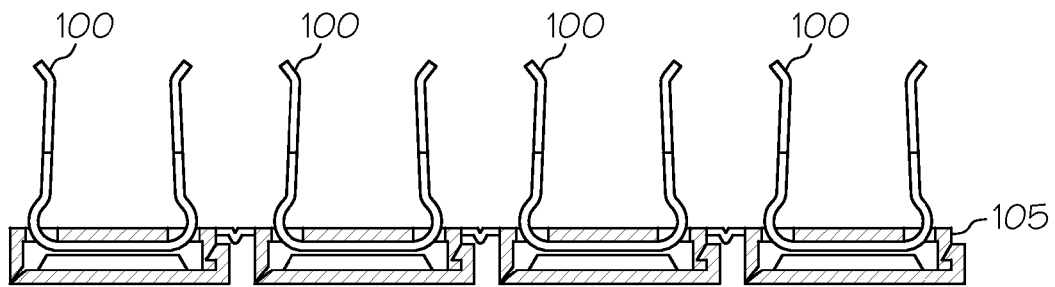
FIG. 14 is an illustration of a bandoleer of spring loaded metal clips.

A series of clips 100 can be attached to a non-conducting flexible strip, or bandoleer, 105, as shown in FIG. 14. The clips are spaced on the bandoleer so that they can be inserted into the molded slots on alternating frames that encase the stack of prismatic battery cell. In one embodiment where the positive and negative tabs are on opposite sides of the battery cell, there would be one bandoleer on each side of the battery pack in order to form the necessary connections. This allows for some dimensional variation in the stack. The frame and clips can be designed to ease the assembly and disassembly process, minimize wear on the cell tab surface, and maintain low-resistance electrical conduct after assembly.

The bandoleer can be made of a non-conducting flexible material, such as a plastic. Examples of suitable plastics include, but are not limited to, polypropylene or nylon. It could be a molded part with a strip of plastic between the holder to allow some movement along its length. Instead of using the voltage sensor holes to monitor the voltage, the bandoleers can provide electrical monitor wires at each clip, which are bundled in the bandoleer for connection to a common battery management system.

The battery management system can monitor one or more conditions within the battery pack, including, but not limited to, the voltage, the current, and the temperature at selected points in the battery pack, if desired. The resulting readings can be used for a variety of purposes, such as diagnostics or running the vehicle in a different mode. During a charge cycle, the battery management system can prevent overcharging of individual cells by transferring energy using simple resistors or potentially to adjacent cells that are capable of absorbing the energy, depending on the design of the battery management system.

When external power connectors are used, the battery stack remains a low voltage (e.g., 3 V) system until the bandoleers are fully inserted and returns to a low voltage system at the moment either bandoleer is partially disengaged. This provides an opportunity for significant improvement in electrical safety during manufacturing, servicing at the dealers, and remanufacturing. Manufacturing costs can be reduced because of the significant reduction in the high voltage areas of the plant by installing the bandoleer at final assembly just before closing the cover. In addition, cell charging can be done conveniently and more economically on individual cells after assembly, but before installing the bandoleer.

The ability to disengage the high voltage by pulling the bandoleer immediately after removal of the battery cover enables more repair options, including individual cell replacement, which can allow for a greater role by dealers in the repair process.

Pressure is applied directly by the elastic properties of the clip to maintain low-resistance electrical contact. This reduces or eliminates the reliance on pressure applied through the frame stack (e.g., using one or more bolts though the integrated frames and end frames) which may be subject to dimensional variation in the stack.

In one embodiment, the integrated frames and clips can include ramp 102 and notch features, respectively, to keep the clip open and mechanically prevent the clip from sliding across the cell tabs during the insertion process. A ramp 102 in the slot forces the prongs of the clip open until the notch clears the ramp, at which time the clip snaps vertically onto the cell tab surfaces. This results in zero or minimal sliding of the clip on the cell tab surface during insertion.

An insertion tool can be used in assembly and disassembly. The tool is temporarily attached to the bandoleer, forcing the clips to open wider than is required to pass over the ramp without touching. The tool eliminates the need to apply excessive force or to tap the battery frame during assembly. The tool can also be used to disengage the bandoleer by opening the clips wide enough to clear the locking mechanism in the ramp-notch feature. The pins on the tool open and close the clip opening in the direction vertical to the tab contact, so no wear occurs on the electrode surface.

Figure 15:
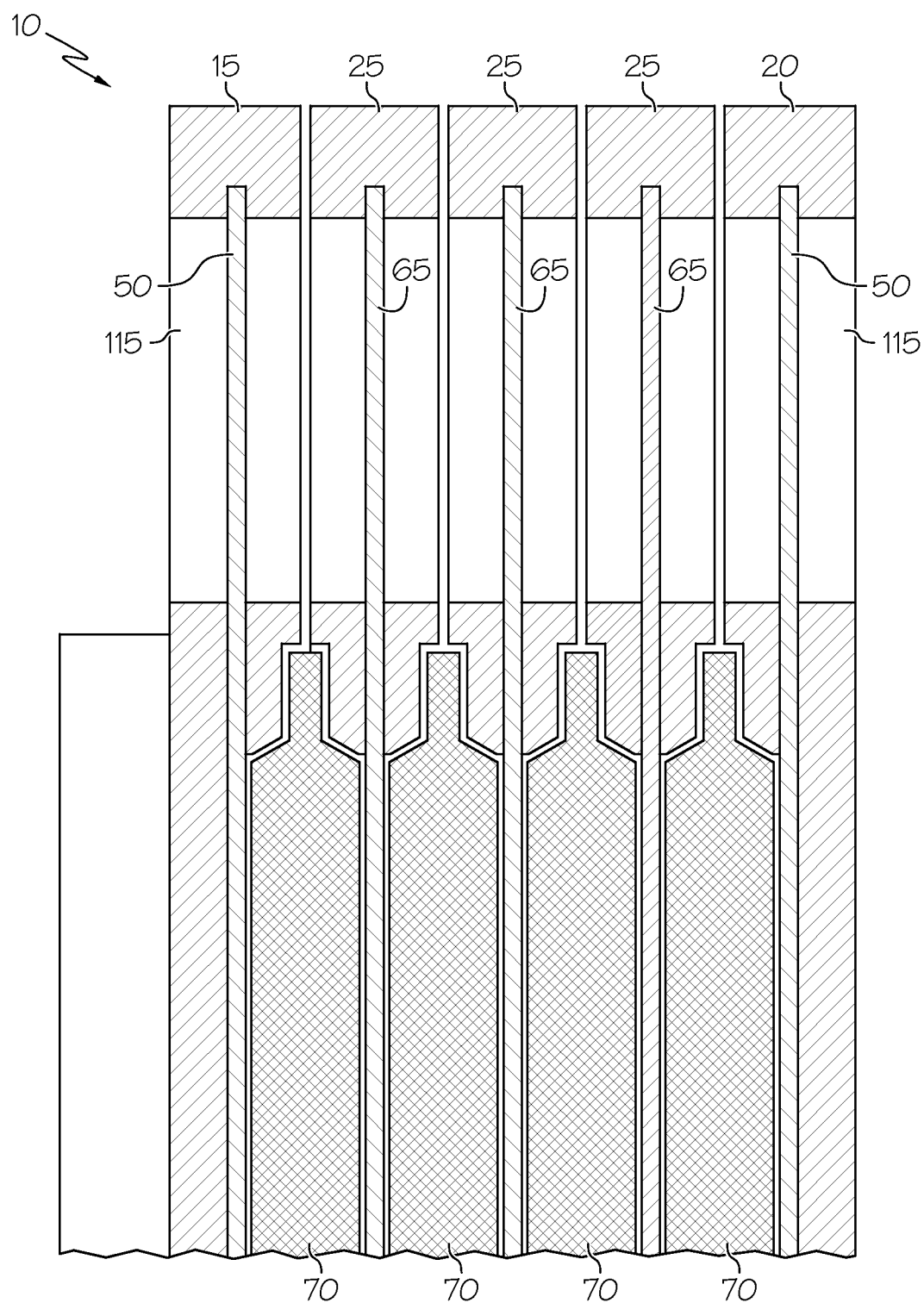
FIG. 15 is a portion of a top plan view of one embodiment of an assembled battery pack.

FIG. 15 shows a portion of an embodiment of the battery pack 10 which includes cooling channels 115 in the end frames 15, 20 and integrated frames 25. The cooling channels are open spaces for a flow path to allow the coolant to pass over the exposed cooling fin.

Figure 16:
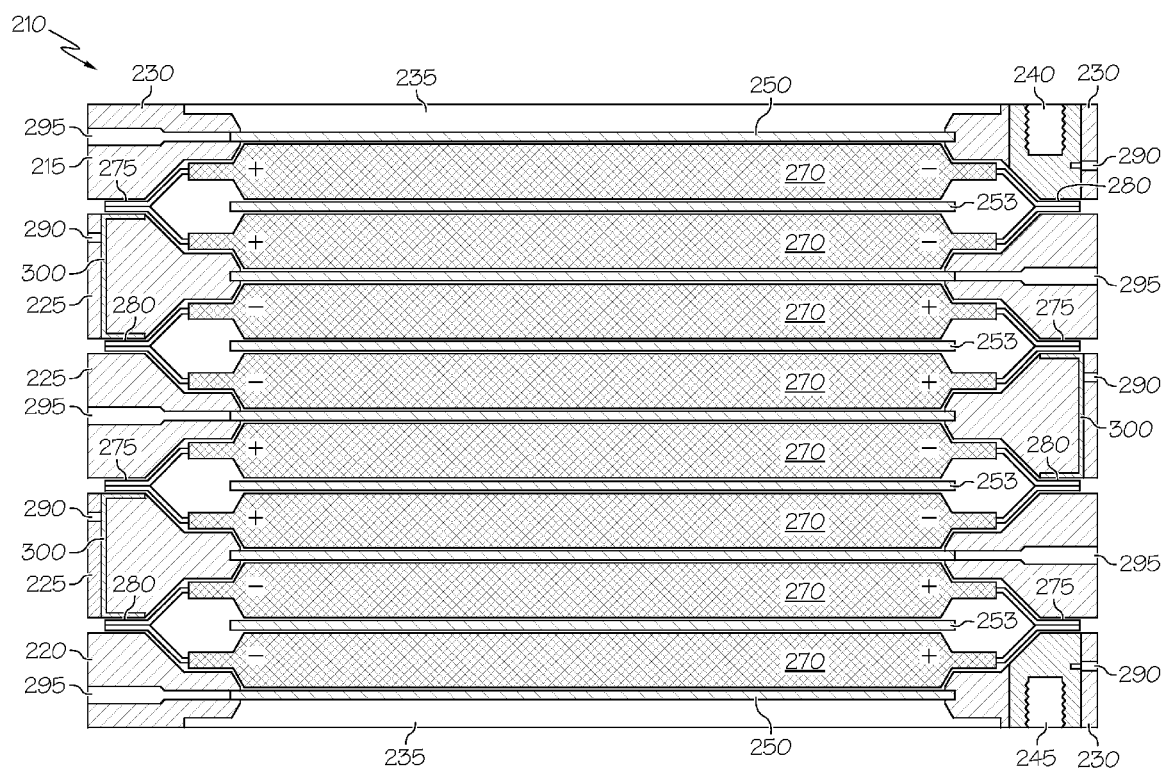
FIG. 16 is a top plan view of another embodiment of an assembled battery pack.
Figure 17:
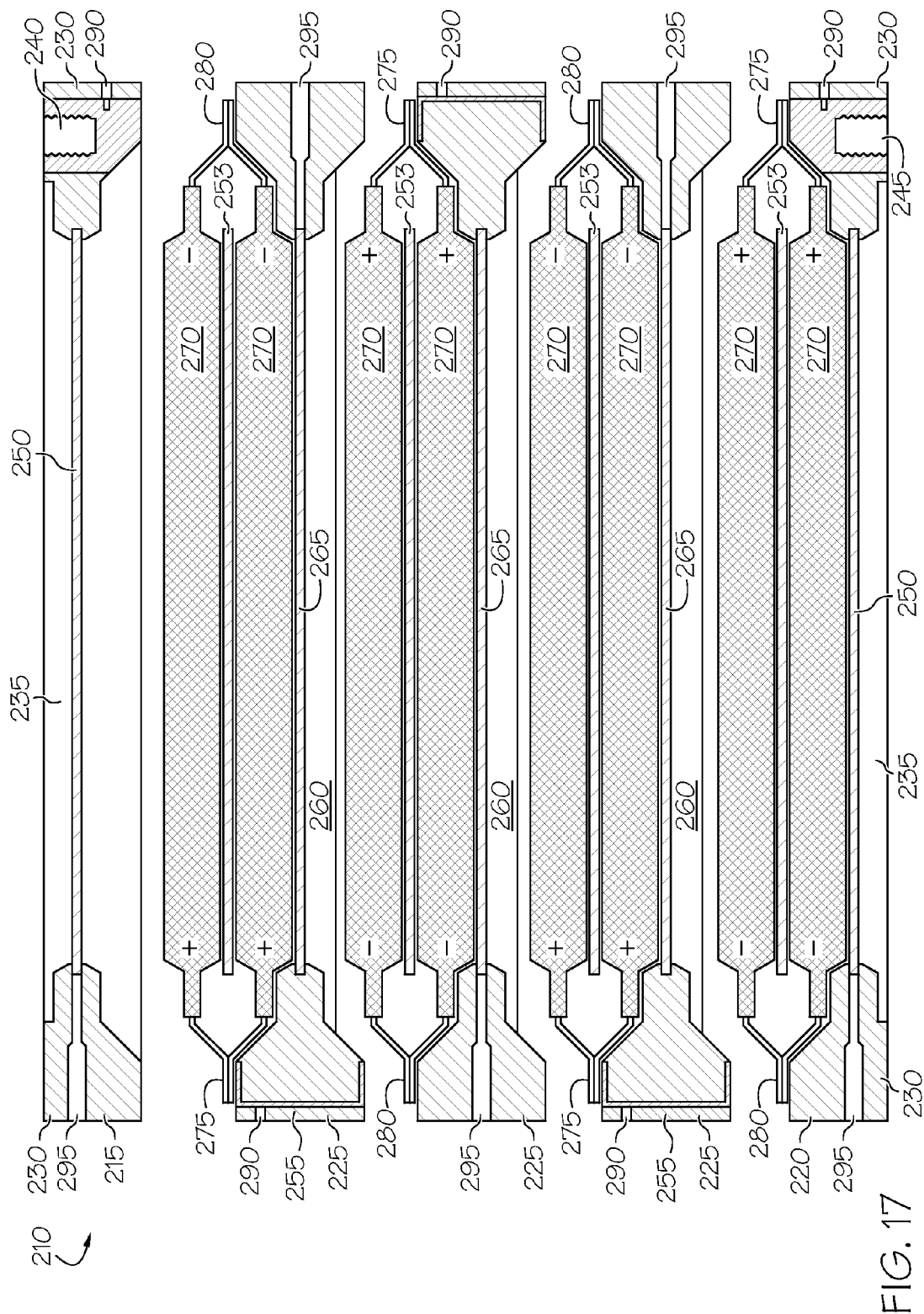
FIG. 17 is an exploded view of the embodiment of FIG. 16.

FIGS. 16-17 show another embodiment in which battery cells are connected in parallel. The battery pack 210 has a pair of end frames 215, 220 and integrated frames 225 positioned between the end frames 215, 220. The end frames 215, 220 have raised edge portions 230 surrounding an inner portion 235. There is a negative terminal 240 in end frame 215 and a positive terminal 245 in end frame 220. The end frames 215, 220 can include a cooling fin 250 extending across the inner portion 235, if desired.

The integrated frames 225 have raised outer portions 255 surrounding inner portions 260. The integrated frames 225 can include a cooling fin 265 extending across the inner portion 260, if desired.

Pairs of battery cells 270 are positioned in the inner portion 260 of the integrated frames 225 and end frame 220. The pairs of battery cells 270 have positive tabs 275 and negative tabs 280. The pairs of battery cells 270 can be separated by loose cooling fins 253, if desired.

The battery cells 270 and the positive tabs 275 and negative tabs 280 are supported by the raised outer portions 255 of the integrated frames 225 or the raised edge portions 230 of the end frame 220. The battery cells 270 might also supported by the cooling fins 250 and 265.

The raised portions of the end frames and integrated frames are different in this embodiment from those in the single battery cell embodiment. The frames will be wider in order to accommodate both cells and the loose cooling fins, if present.

The integrated frames and/or the end frames can optionally include voltage sensor holes 290 and/or temperature sensor holes 295.

The positive tabs 275 and negative tabs 280 of adjacent battery cells are electrically connected by power connectors as described above, for example. The power connector can be an internal power connector or an external power connector, such as a spring loaded metal clip 300.

The integrated frames can include error proofing features, if desired. Error proofing features help to prevent mistakes by allowing assembly to occur only is the correct way. Error proofing features are well known in the art.

Figures 18A, 18B:
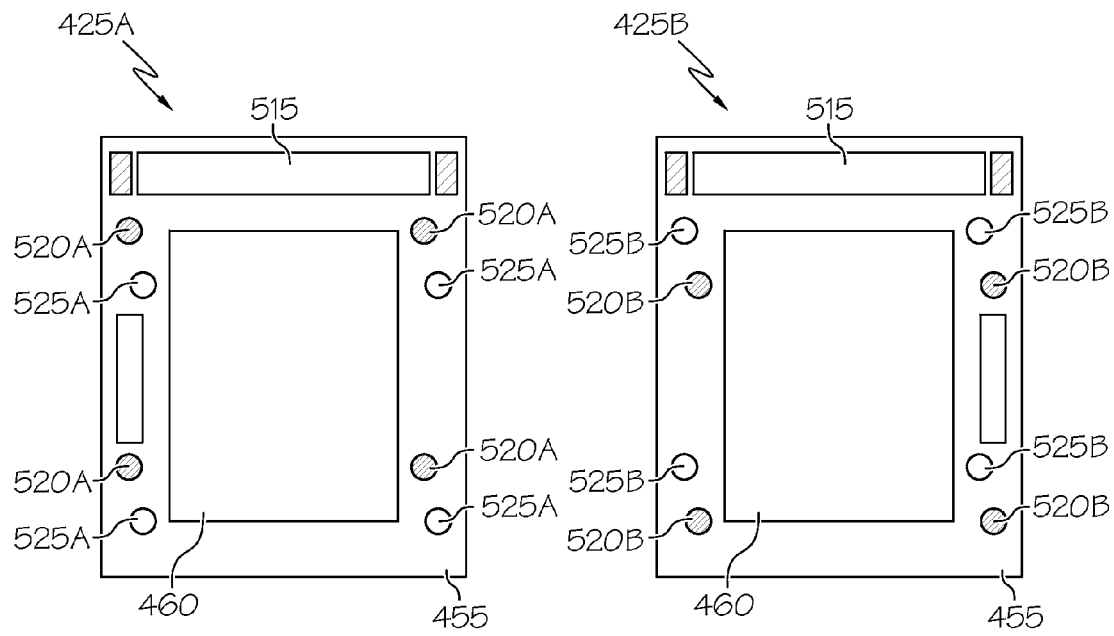
FIGS. 18A-D are illustrations of two embodiments of the integrated frames.
Figures 18C, 18D:
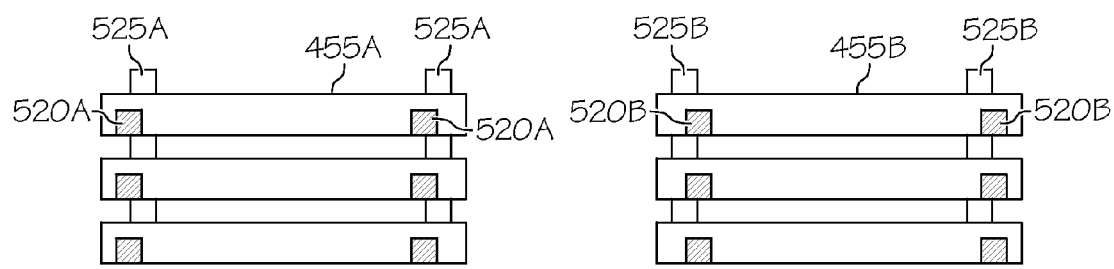

FIGS. 18A-D show one example of integrated frames with error proofing features, There are right and left integrated frames 425A and 425B. The integrated frames have raised edge portions 455 (shown generally as 455 in FIGS. 18A and 18B, and with particularity as 455A in FIG. 18C and as 455B in FIG. 18D) and inner portions 460. There are cooling channels 515. There are interlocking holes 520A and 520B and pins 525A and 525B. The interlocking pins and holes interlock the integrated frames. The interlocking holes 520 and pins 525 can be offset on the right and left frames. The right frame could have two sets of holes and two sets of pins offset from the holes, while the left frame had two sets of pins corresponding to the holes in the right frame and two sets of holes corresponding to the pins in the right frame. The holes 520A on the right frame 425A mate with the pins 525B on the left frame 425B, and the pins 525A on the right frame 425A mate with the holes 520B. The right frames 425A and left frames 425B can be easily stacked and separated as shown in FIGS. 18C-D.

Right and left frames 425A and 425B would be alternated to make the battery pack. This arrangement makes assembly of the battery pack error proof because the offset of the pins and holes require alternating right and left frames.

Figure 19A:
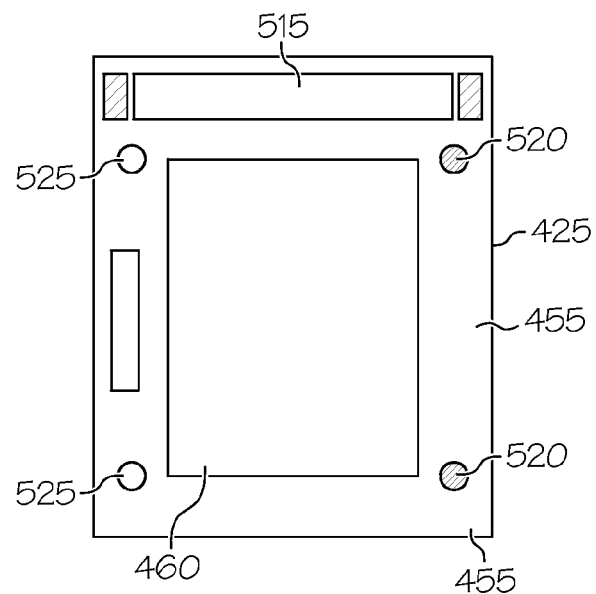
FIGS. 19A-C are illustrations of another embodiment of an integrated frame.
Figure 19B:
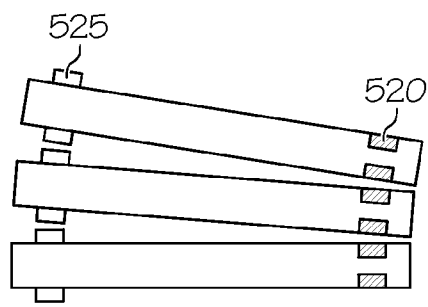
Figure 19C:
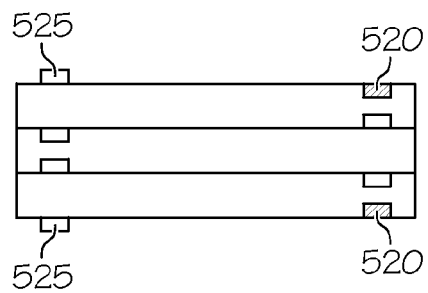

A single frame could be used as shown in FIGS. 19A-C and 20A-C. In the embodiment shown in FIGS. 19A-C, the frame 425 has raised edge portions 455 and inner portion 460. There are cooling channels 515. There are symmetric interlocking holes 520 and pins 525. In this arrangement, the pins are always on one side and the holes are always on the other, which makes stacking and unstacking somewhat more difficult. The frames are flipped over when manufacturing the battery pack, as shown in FIG. 19C, providing error proof manufacturing.

Figure 20A:
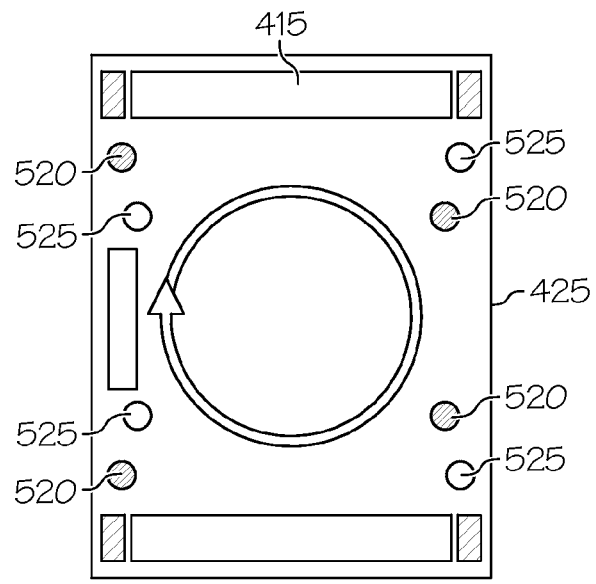
FIGS. 20A-C are illustrations of another embodiment of an integrated frame.
Figure 20B:
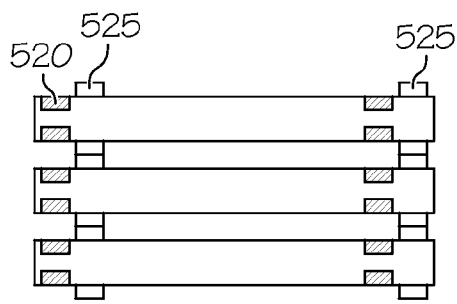
Figure 20C:
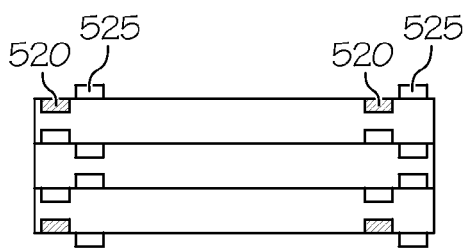

Another single frame embodiment is shown in FIG. 20A-C. In this embodiment, there is a diagonally symmetric design of pins 525 and holes 520. The frames can be easily stacked and unstacked because they are pin to pin, as shown in FIG. 20B. Every other frame is rotated 180°, providing error proof manufacturing.

It is noted that terms like "preferably," "commonly," and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

For the purposes of describing and defining the present invention it is noted that the term "device" is utilized herein to represent a combination of components and individual components, regardless of whether the components are combined with other components. For example, a "device" according to the present invention may comprise an electrochemical conversion assembly or fuel cell, a vehicle incorporating an electrochemical conversion assembly according to the present invention, etc.

For the purposes of describing and defining the present invention it is noted that the term "substantially" is utilized herein to represent the inherent degree of uncertainty that may be attributed to any quantitative comparison, value, measurement, or other representation. The term "substantially" is also utilized herein to represent the degree by which a quantitative representation may vary from a stated reference without resulting in a change in the basic function of the subject matter at issue.

Having described the invention in detail and by reference to specific embodiments thereof, it will be apparent that modifications and variations are possible without departing from the scope of the invention defined in the appended claims. More specifically, although some aspects of the present invention are identified herein as preferred or particularly advantageous, it is contemplated that the present invention is not necessarily limited to these preferred aspects of the invention.

What is claimed is:

1. An integrated cooling fin and frame comprising:
a generally planar cooling fin having at least one cooling channel formed adjacent to a surface and at least one edge thereof, the cooling channel having an inlet and an outlet; and
a frame configured to be placed around the cooling fin and the cooling channel to cover the edges of the cooling fin and a substantial entirety of the cooling channel, the frame having a first opening formed therein for the inlet and a second opening formed therein for the outlet of the cooling channel.

2. The integrated cooling fin and frame of claim 1 wherein the cooling fin is made of a thermally conductive material.

3. The integrated cooling fin and frame of claim 2 wherein the thermally conductive material is aluminum, alumina, copper, aluminum silicon carbide, beryllium oxide, or combinations thereof.

4. The integrated cooling fin and frame of claim 1 wherein the frame has at least one hole for a mechanical connector.

5. The integrated cooling fin and frame of claim 1 wherein the frame has a tab with a hole for a mechanical connector.

6. The integrated cooling fin and frame of claim 1 wherein the cooling channel extends around three edges.

7. The integrated cooling fin and frame of claim 1 wherein the cooling channel extends around four edges.

8. The integrated cooling fin and frame of claim 1 wherein the cooling fin comprises a pair of thermally conductive plates separated by a layer of an expansion compensator.

9. The integrated cooling fin and frame of claim 8 wherein the expansion compensator is a compressible foam.

10. A battery pack comprising;
    a pair of end frames, one end frame having a positive terminal and the other end frame having a negative terminal;
    at least one integrated cooling fin and frame comprising:
        a generally planar cooling fin having a cooling channel formed adjacent to a surface and at least one edge thereof, the cooling channel having an inlet and an outlet; and
        a frame configured to be placed around the cooling fin and the cooling channel to cover the edges of the cooling fin and a substantial entirety of the cooling channel, the frame having a first opening formed therein for the inlet and a second opening formed therein for the outlet of the cooling channel;
    a plurality of battery cells placed within the integrated cooling fin and frame, each of the plurality of battery cells having a positive tab and a negative tab, the positive tab of one of the plurality of battery cells electrically connected to the positive terminal, and the negative tab of another one of the plurality of battery cells electrically connected to the negative terminal, the integrated cooling fin and frame cooperative to electrically isolate edges of each of the plurality of battery cells from the cooling fin by the covering of the edge of the cooling fin with the frame;
    at least one power connector electrically connecting the negative tab of one of the battery cells with the positive tab of an adjacent one of the plurality of battery cells; and
    a fluid manifold connected to the cooling channel inlet and outlet for circulating fluid to the cooling channel.

11. The battery pack of claim 10 wherein the cooling fin is made of a thermally conductive material.

12. The battery pack of claim 11 wherein the thermally conductive material is aluminum, alumina, copper, aluminum silicon carbide, beryllium oxide, or combinations thereof.

13. The battery pack of claim 10 wherein the frame has at least one hole for a mechanical connector.

14. The battery pack of claim 10 wherein the frame has a tab with a hole for a mechanical connector.

15. The battery pack of claim 10 wherein the cooling channel extends around three edges.

16. The battery pack of claim 10
    wherein the integrated cooling fin and frame electrically isolate the cell tabs from the cooling fin.

17. The battery pack of claim 10 wherein the cooling fin comprises a pair of thermally conductive plates separated by a layer of an expansion compensator.

18. A method of making an integrated cooling fin and frame comprising:
    providing a generally planar cooling fin having a cooling channel formed adjacent to a surface and on at least one edge thereof, the cooling channel having an inlet and an outlet; and
    molding a frame around the cooling fin so that the frame:
        covers a substantial entirety of the cooling channel and the edges of the cooling fin;
        seals the cooling fin to the frame, and
        has an opening for the inlet and an opening for the outlet of the cooling channel.

19. The method of claim 18 wherein the frame is molded using injection molding.

* * * * *